Nov. 4, 1958
K. L. KING
2,859,396
SCANNING SYSTEM
Filed Aug. 31, 1955
2 Sheets-Sheet 1
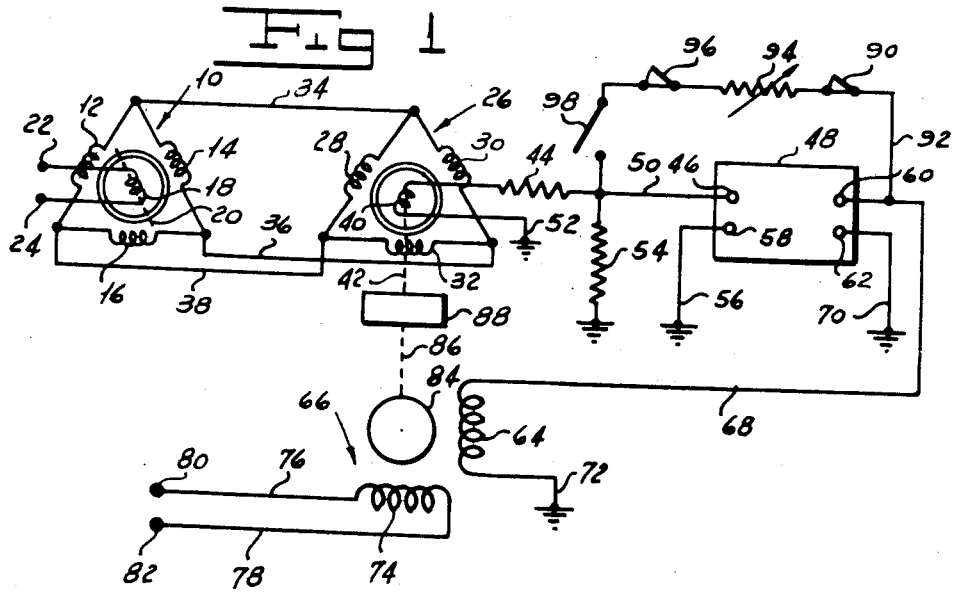
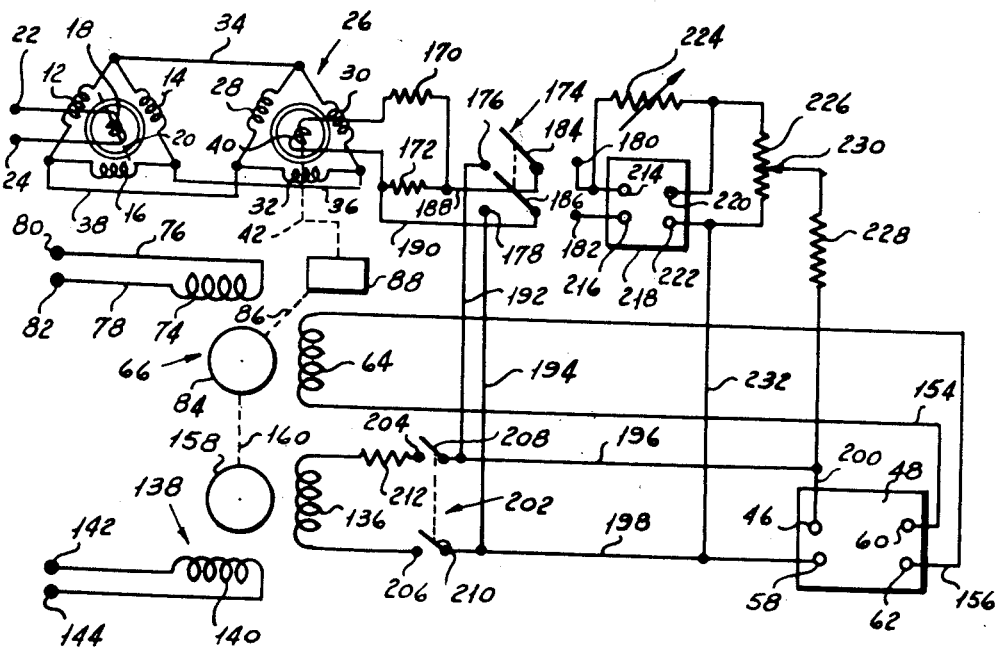
INVENTOR.
KENNETH L. KING
BY
ATTORNEY United States Patent Office 2,859,396
Patented Nov. 4, 1958

2,859,396

SCANNING SYSTEM

Kenneth L. King, Scarsdale, N. Y., assignor, by mesne assignments, to United Aircraft Corporation, East Hartford, Conn., a corporation of Delaware Application August 31, 1955, Serial No. 531,693

6 Claims. (Cl. 318—282)

My invention relates to a scanning system and more particularly to a scanning servomechanism in which a scan or oscillating motion is superimposed about a stabilized center position of a synchronous transformer rotor which is driven in accordance with some arbitrary mathematical control function.

A servomechanism is generally employed to drive the antenna of a radar installation or the like in accordance with an arbitrary control function. In such a system the stator of a synchronous control transformer is electrically coupled with the stator of a synchronous transmitter. The synchronous control transformer rotor produces an output error signal which represents the difference in angular position between the transmitter rotor and the control transformer rotor. This error signal is amplified and fed to a control servomotor which drives the control transformer rotor in a direction to reduce the error signal to zero. The control transformer rotor of the servomechanism may be made to follow an arbitrary mathematical control function. The servomotor drive shaft may drive the antenna of the installation. By varying the arbitrary control function in accordance with which the synchronous transmitter rotor is driven, the antenna may be driven in any desired manner. It may, for example, be rotated or it may be provided with an oscillatory motion to scan an area between predetermined limits. It is advantageous that some means be provided for superimposing a scan or oscillating motion on the antenna motion. It is to be understood that the antenna motion follows a predetermined function. For example, if the antenna sweep motion is large, it may be desirable to scan sectors of this motion at a greater rate than the antenna sweep rate. Further, if an arbitrary control signal is generated, as by a manual movement of the synchronous transmitter rotor, some scan should be provided while the antenna is being moved from position to position.

I have invented a system for superimposing a scan or oscillatory motion about a stabilized center position of the synchronous transformer rotor of a servomechanism driven in accordance with an arbitrary control function.

One object of my invention is to provide a scanning system for superimposing a scan about a stabilized center position of a synchronous control transformer rotor of a servomechanism.

A further object of my invention is to provide a scanning system for superimposing a scan having variable limits about the center position of a synchronous control transformer rotor of a servomechanism driven in accordance with an arbitrary control function.

Another object of my invention is to provide a scanning system for superimposing a scan having a regulated rate about the center position of a synchronous control transformer rotor of a servomechanism driven in accordance with an arbitrary control function.

A still further object of my invention is to provide a scanning system for superimposing a scan having variable limits and a regulated rate about the center position of a synchronous control transformer rotor of a servomechanism driven in accordance with an arbitrary control function.

Other and further objects of my invention will appear from the following description.

In general my invention contemplates the provision of a scanning servomechanism which is rendered controllably unstable by means of a positive feed-back loop having a gain which is greater than unity. The input to my system may be a signal in accordance with any arbitrary control function. The positive feed-back loop drives the system to superimpose a scan around the stabilized center position of the synchronous transformer rotor of the system. I have provided my system with means for varying the scan limits and with means for regulating the rate of scan.

In the accompanying drawings which form part of the instant specification and which are to be read in conjunction therewith and in which like reference numerals are used to indicate like parts in the various views:

Figure 1 is a schematic view of one form of my scanning system.

Figure 3 is a schematic view of yet another form of my scanning system.

Figure 2:
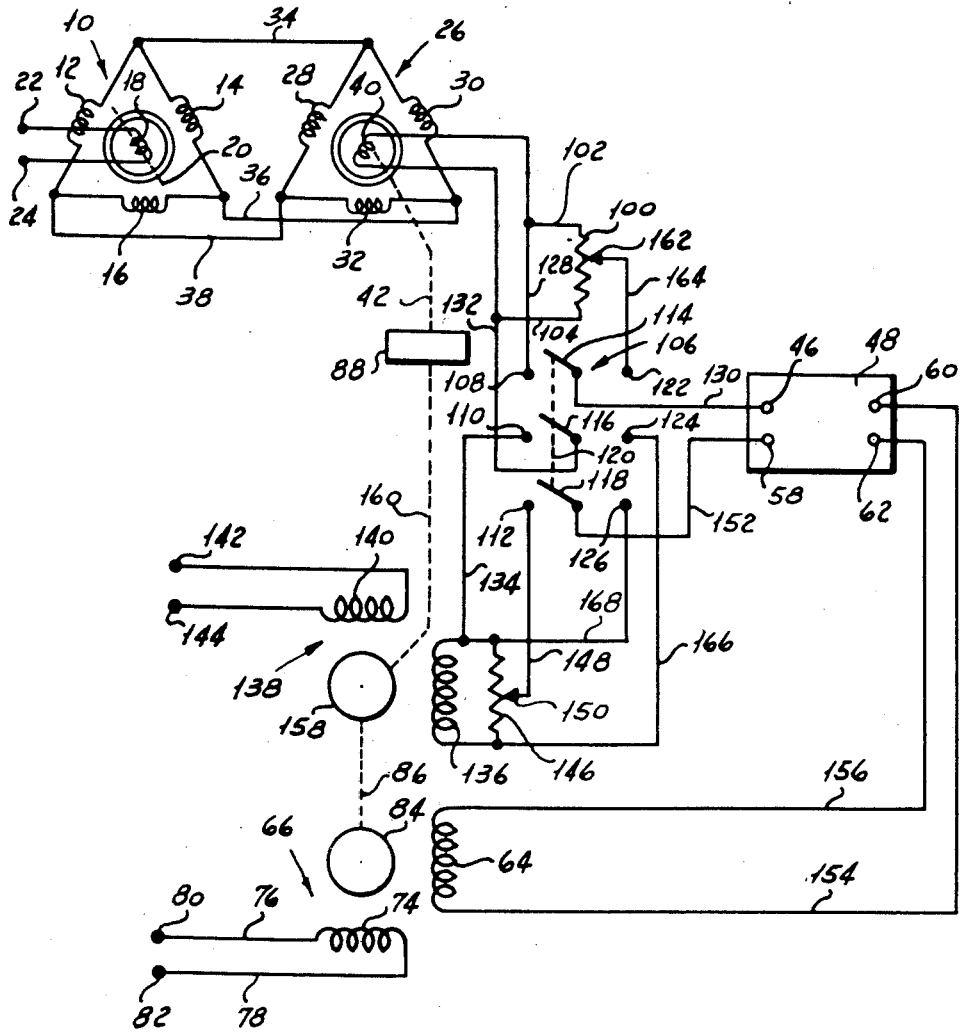
Figure 2 is a schematic view of a second form of my scanning system.

More particularly referring now to the drawings, my scanning system includes a synchronous control transmitter, indicated generally by the reference character 10, having respective stator windings 12, 14 and 16. Windings 12, 14 and 16 may be Y-connected or Δ-connected. Conveniently, I have shown the stator windings as being Δ-connected. Transmitter 10 includes a rotor 18 carried by a shaft 20. The input terminals 22 and 24 of rotor 18 are connected to any appropriate source of alternating current potential.

My system also includes a synchronous control transformer, indicated generally by the reference character 26, which includes respective Δ-connected stator windings 28, 30 and 32. The stator windings of transformer 26 are interconnected with the stator windings of transmitter 10 in the conventional manner. A conductor 34 connects the junction of windings 12 and 14 with the junction of windings 28 and 30. A second conductor 36 connects the common terminal of windings 14 and 16 with the common terminal of windings 30 and 32. A third conductor 38 connects the common terminal of windings 12 and 16 with the common terminal of windings 28 and 32.

The control transformer 26 also includes a rotor winding 40 carried by a shaft 42. The operation of the system thus far described is known to the art. The alternating potential impressed on terminals 22 and 24 of rotor winding 18 produces a flux in the control transmitter in the direction of the axis of shaft 20. This flux induces voltages in the respective windings 12, 14 and 16. The connections provided by conductors 34, 36 and 38 couple the induced voltages in windings 12, 14 and 16 to the respective windings 28, 30 and 32 of the transformer 26. Corresponding stator windings in control transformer 26 have the same voltages as like stator windings in the synchronous transmitter 10. As a result of the interconnection of the respective stators of transmitter 10 and transformer 26, a flux is produced in transformer 26 which is in the same direction as the flux in transmitter 10. Any induced voltage in rotor winding 40 of transformer 26 depends on the position of the rotor with respect to this flux. If the axis of rotor 40 is perpendicular to the flux in the transformer, no voltage is induced in the rotor. If, however, the axis of rotor 40 is parallel to the flux in the transformer, a maximum voltage is induced in the rotor. The component of the flux which is parallel to the axis of rotor 40 is the component which induces a voltage in rotor 40. Consequently, the voltage induced in rotor 40 is proportional to the sine of the angular difference in position between the axis of rotor 20 and a line perpendicular to the axis of rotor 40. The output error signal from rotor 40, which is the voltage induced therein, represents the difference in angular position with respect to an arbitrary reference of rotors 18 and 40.

Rotor winding 40 is connected at one terminal to a resistor 44 which is connected to a first input terminal 46 of an amplifier 48 by a conductor 50. Conductor 52 connects the other side of rotor winding 40 to ground. A resistor 54 is connected between conductor 50 and ground. A conductor 56 connects the other input terminal 58 of amplifier 48 to ground. It will be appreciated that resistors 44 and 54 form a voltage divider by means of which a portion of the output error signal appearing on rotor 40 is impressed on amplifier 48. The output stage of amplifier 48 provides a fixed frequency, variable amplitude, reversible phase voltage output. The voltage appearing at the output terminals 60 and 62 of amplifier 48 is an amplified representation of the difference in angular position of rotors 18 and 40 with respect to an arbitrary reference.

I provide means for impressing the output voltage from amplifier 48 on one stator winding 64 of a servomotor, indicated generally by the reference character 66. A conductor 68 connects terminal 60 of amplifier 48 to one side of winding 64. A conductor 70 connects terminal 62 of amplifier 48 to ground. A conductor 72 connects the other side of winding 64 to ground. The other winding 74 of servomotor 66 is connected by respective conductors 76 and 78 to a pair of terminals 80 and 82 supplied with an alternating potential from the same source as are terminals 22 and 24 but shifted through 90 degrees. When an angular difference in position between rotor winding 18 and a line perpendicular to rotor winding 40 exists, the voltage on servomotor winding 64 drives the servomotor armature 84 in a direction to reduce the error signal to zero. Armature 84 is carried by a shaft 86 connected with shaft 42 by gears 88.

The system thus far described is a conventional servomechanism. When there is an angular difference in position between rotor winding 18 and a line perpendicular to rotor winding 40, rotor 40 has an output error signal voltage which is proportional to the sine of the angular difference. A portion of the output signal from rotor 40 is amplified by amplifier 48. The amplified signal is impressed on winding 64 of servomotor 66 to drive armature 84 in a direction to reduce the error signal to zero. Armature 84 drives shaft 86 which, through gearing 88, drives the shaft 42 of rotor 40. Shaft 42 is driven in a direction to reduce the error signal output from winding 40 to zero. When the error signal has been reduced to zero, winding 40 is perpendicular to the flux in the control transformer 26. At the same time winding 18 is aligned with the flux in the control transmitter.

In accordance with my invention, I have advantageously provided a positive feed-back loop for rendering the servomechanism thus far described controllably unstable. I connect output terminal 60 of amplifier 48 to a limit switch 90 by a conductor 92. A variable feed-back resistor 94 connects limit switch 90 with a second limit switch 96. A switch 98 connects limit switch 96 to conductor 50 which leads to the input terminal 46. It will be appreciated that the circuit including limit switch 90, resistor 94, limit switch 96 and switch 98 provides a positive feed-back loop for amplifier 48. I select the loop gain of this feed-back loop to be greater than unity. Consequently, any slight disturbance at the input terminals 46 and 58 will drive the amplifier to saturation when switch 98 is closed. If I denote the respective resistances of resistors 54, 94 and 44 by $R_1$, $R_2$, $R_3$, the feed-back voltage $E_{fb}$ will be:

$$(1) \quad E_{fb} \propto \frac{R_1 R_3}{R_2(R_1+R_3)+R_1 R_3}$$

The product of the amplifier gain times the term on the right-hand side of Expression 1 is greater than unity so that the amplifier is driven to saturation when switch 98 is closed. Since the output voltage of the amplifier is always at the carrier frequency, the amplifier saturates at its maximum voltage output level at the carrier frequency.

If rotor 40 is slightly displaced from its null or zero error signal position, a small error signal is produced at the input to the amplifier. This produces a voltage at the amplifier output which is of such a phase as to cause servomotor 66 to drive rotor 40 back to the null position. Because of the positive feed-back loop, however, the amplifier 48 is immediately driven to saturation. Consequently, the servomotor 66 drives rotor 40 through the null position. The speed of servomotor 66 after its initial acceleration is essentially constant, since the output voltage from amplifier 48 is at the fixed saturation level. The speed of the motor is determined and controlled by the saturation level of the amplifier and by the motor characteristics.

After rotor 40 has been driven by the servomotor 66 back through its null or zero error signal position, its output error signal is of such phase as normally would cause the servomotor to again return it to its null. This signal normally would cause the direction of servomotor rotation to reverse. This reversed phase potential of the output of rotor 40 will not, however, immediately be effective. It must first overcome the feed-back voltage from the output of amplifier 48. It may readily be demonstrated that the relationship between the input voltage $E_r$ to amplifier 48 from rotor 40 and the output voltage $E_0$ from amplifier 48 at the point just ahead of the point at which the servomotor reverses is:

$$(2) \quad E_r = -E_0 \cdot \frac{R_3}{R_2}$$

From Equation 2 it can be seen that the portion of the output voltage from the synchronous transformer rotor 40 which is applied to amplifier 48 is not effective until it exceeds the amplifier output voltage $E_0$ times the ratio $R_3/R_2$. As soon as this portion of the synchronous transformer rotor output voltage exceeds the amplifier output voltage times the ratio $R_3/R_2$, the phase of the input to amplifier 48 reverses and the direction of rotation of servomotor 66 reverses. Rotor 40 is driven back through its null and the cycle is repeated. The over-all result of this action is a scan superimposed about the center position of the stabilized rotor 40 between limits determined by the ratio $R_3/R_2$. If $R_2$ is decreased, the extent of scan becomes greater, since the synchronous transformer rotor output must then become greater before reversal of the servomotor 66 takes place. Since the output signal from rotor 40 is a function of the sine of its displacement with reference to rotor 18, the theoretical limits of scan are plus or minus 90 degrees from the stabilized center position or position of zero error signal. It is to be understood that the scanning motion I provide is always centered on the null position of the synchronous transformer rotor 40 and continually adjusts itself to the motion of the control transmitter which is in accordance with the arbitrary control function.

The scanning motion I provide may be disabled at any time by interrupting the feed-back loop provided by resistor 94. If the system has mechanical limits of scan which are less than the attainable electrical limits, I advantageously provide limit switches 90 and 96 for interrupting the feed-back loop at the respective mechanical scan limits. These switches are so placed with respect to rotor 40 that they are opened by the rotor when the respective mechanical limits are reached. For example, if rotor 40 is being driven toward the limit at which switch 90 is placed, it interrupts the feed-back loop when it engages switch 90. When the feed-back loop is thus interrupted, the fed back signal to amplifier 48 is removed and the output signal from rotor 40 is effective. Consequently, after switch 90 is opened servomotor 66 receives a signal which drives the servomotor and rotor 40 in a direction toward switch 96. As soon as the direction of rotation of rotor 40 is reversed, switch 90 is permitted to close and the feed-back loop is re-established until rotor 40 actuates limit switch 96. The limits of the scan are thus determined mechanically by switches 90 and 96 rather than electrically by the characteristics of the system.

In Figure 2 I have shown an alternate form of my invention in which the positive feed-back loop includes a tachometer generator providing an in phase feed-back signal. In this form of my invention I connect a voltage dividing resistor 100 across the rotor 40 by respective conductors 102 and 104. I provide this form of my invention with a reversing switch, indicated generally by the reference character 106, for connecting the system to operate as a stable servomechanism in a conventional manner or to operate with controlled instability to provide my superimposed scan. Switch 106 is a triple-pole, double-throw switch including a first group of contacts 108, 110 and 112 which are engaged by respective poles 114, 116 and 118 in a first position of switch 106. Poles 114, 116 and 118 are mechanically ganged by any convenient means 120 and may be actuated to engage respective contacts 122, 124 and 126 in a second position of switch 106.

When switch 106 is in a position where the respective poles 114, 116 and 118 engage contacts 108, 110 and 112, the system of Figure 2 is connected to operate as a stable servomechanism. Conductor 102 is connected to contact 108 by a conductor 128. Pole 114 which engages contact 108 in the first position of switch 106 is connected by a conductor 130 to input terminal 46 of amplifier 48. A conductor 132 connects conductor 104 to pole 116 which engages contact 110. A conductor 134 connects contact 110 to one side of a first stator winding 136 of a tachometer generator, indicated generally by the reference character 138. Generator 138 includes a second stator winding 140 supplied with alternating current potential through terminals 142 and 144 from the same source which supplies terminals 22 and 24. I provide a voltage dividing resistor 146 connected in parallel with winding 136. A conductor 148 connects a brush 150, associated with dividing resistor 146, to terminal 112. The pole 118 which engages terminal 112 in the first position of switch 106 is connected by a conductor 152 to input terminal 58 of amplifier 48. Respective conductors 154 and 156 connect output terminals 60 and 62 of amplifier 48 to winding 64 of servomotor 66. In this form of my invention the shaft 86 of servomotor 66 drives the armature 158 of servomotor 138. Shaft 160 of the generator 138 drives gears 88 which drive shaft 42 of rotor 40.

When switch 106 is in its first position in which the respective poles 114, 116 and 118 engage terminals 108, 110 and 112, the system is connected to operate as a stable servomechanism with slight degenerative feed-back to provide stability. The circuit provided by actuation of switch 106 to its first position applies the output voltage from rotor 40 in series with a portion of the output voltage of generator 138 to the input terminals 46 and 58 of amplifier 48. This circuit may be traced from terminal 46, through conductor 130, through pole 114, through conductor 128, through voltage dividing resistor 100, through conductor 104, through conductor 132, through pole 116, through conductor 134, through a portion of dividing resistor 146, through brush 150, through conductor 148, through pole 118 and through conductor 152 to terminal 58. The phase of the portion of the tachometer generator output voltage applied to amplifier 48 is opposite to the phase of the voltage on resistor 100.

Thus, degeneration is introduced to ensure stability in the system. The rotor 40 of the control transformer 26 is caused to follow the movements of the rotor 18 of control transmitter 10 in a conventional manner. An output error signal from rotor 40 is applied to the input terminals 46 and 58 of amplifier 48 in series with a portion of the output signal from generator 138. The amplified error signal is applied to winding 64 of servomotor 66 to drive the servomotor in a direction to reduce the error signal. Shaft 86 drives armature 158 to drive shaft 160 to drive rotor 40 in a direction to reduce the error signal to zero. As armature 158 of tachometer generator 138 is driven, it induces an output signal in winding 136 which is proportional to the speed at which the armature is driven. A portion of this signal, determined by brush 150, is fed back into the amplifier 48 in such a direction as to introduce degeneration. This negative feedback ensures stability in the system by preventing overrunning of the rotor 40 beyond its null position. It will be seen that in the first position of switch 106, the system operated as a stable servomechanism.

When it is desired to operate the system to provide a superimposed scan about the stabilized center position or position of zero error signal of rotor 40, switch 106 is moved to its second position where the respective poles 114, 116 and 118 engage terminals 122, 124 and 126. In this position of switch 106, a portion of the output signal from rotor 40 is applied in series with the entire output signal from tachometer generator 138 to treminals 46 and 58. The connections provided in this second position of switch 106 reverse the phase of the output signal from generator 138 as it is applied in series with a portion of the output of winding 40 to terminals 46 and 58. A brush 162 associated with voltage dividing resistor 100 is connected by a conductor 164 with the terminal 122 of switch 106. A conductor 166 connects terminal 124 with one side of winding 136. A conductor 168 connects terminal 126 with the other side of winding 136. The circuit providing the input signal for amplifier 48 in the second position of switch 106 may be traced from terminal 46, through pole 114, through conductor 164, through brush 162, through a portion of resistor 100, through conductor 104, through conductor 132, through pole 116, through conductor 166, through the entire resistor 146, through conductor 168, through pole 118 and through conductor 152 to terminal 58. In this position of switch 106 a departure of winding 40 from its null or zero error signal position results in a rotation of servomotor 66 in a direction to bring rotor 40 back to the null position. This rotation of servomotor 66 drives armature 158 to produce an output in winding 136. Because of the reversed phase provided by the second position of switch 106, this output from winding 136 is regeneratively fed back to amplifier 48. I provide a loop gain for the feed-back loop including the tachometer generator 138 which is greater than unity. The loop is, therefore, unstable and any disturbance at the input to amplifier 48 drives the amplifier to saturation. Because of this instability, servomotor 66 drives rotor 40 back through its null position. It is to be understood that the full tachometer voltage with the servomotor turning at maximum speed is sufficient to saturate the amplifier before the tachometer saturates.

After an initial displacement of rotor 40 from its null, the servomotor drives rotor 40 back through its null and continues to drive at maximum speed. During this time the feed-back signal for the system is obtained from the tachometer generator 138. After the rotor 40 passes through its null it has an output signal which is of opposite phase to the phase of the signal produced by tachometer generator 138. The direction of drive of servomotor 66 will not reverse until the algebraic sum of the tachometer generator output voltage and the portion of the output voltage of rotor 40 applied to amplifier 48 becomes less than the voltage necessary to saturate amplifier 48. As soon as this sum drops below the voltage level required to saturate amplifier 48, the direction of drive of servomotor 66 reverses; that is, when the input to amplifier 48 is less than that required to saturate the amplifier, the amplifier output will not be sufficient to drive servomotor 66 at maximum speed. Consequently, the voltage output produced by the tachometer generator immediately drops to reduce the feed-back voltage to amplifier 48. This action continues until the portion of the output voltage of rotor 40 applied to terminals 46 and 58 is greater than the tachometer generator output voltage so that the phase of the input signal to amplifier 48 reverses and the direction of drive of servomotor 66 reverses. It will be understood that this action takes place substantially instantaneously so that the direction of drive of servomotor 66 reverses substantially at the time when the algebraic sum of generator output voltage and the portion of the output voltage of rotor 40 applied to terminals 46 and 58 is less than the voltage required to saturate amplifier 48.

When the direction of rotation of servomotor 66 reverses, the system scans in the opposite direction until the other extreme or limit of scan is reached, at which time the motor again reverses. The limits of the scan provided may be adjusted by moving brush 162 to change the portion of the synchronous transmitter rotor output voltage applied to amplifier 48. The larger the proportion of this output voltage which is used, the smaller will be the scan limits. If a larger proportion of the output signal from rotor 40 is used, the point at which the over-all input signal to amplifier 48 is below that required to saturate the amplifier will be reached sooner in either direction of scan. It will be apparent that the center of the scan pattern in this form of my invention will be centered about the null or zero error signal position of rotor 40 as was the case with the form of the invention shown in Figure 1. This zero error signal position is, of course, determined by the arbitrary control function in accordance with which the rotor 18 of control transmitter 10 is displaced.

In the form of my invention shown in Figure 2, no mechanical limit switches, such as switches 90 and 96, need be employed. If the system has mechanical limits and rotor 40 engages such a limit, motor 66 stops. Tachometer generator 138 also stops and thus produces no output signal to be fed to amplifier 48. The output voltage from rotor 40 then takes over and the system automatically begins to scan in the other direction. It is to be noted also that in this form of my invention neither side of amplifier 48 need be grounded. The output signal from the amplifier may be derived from a bridge-type amplifier or directly from the plates of vacuum tubes. It is not necessary to employ a carrier-type output stage, since saturation at the carrier frequency is ensured by the fact that the tachometer output voltage is at carrier frequency. Further, the output voltage from amplifier 48 need not be in phase with the input but may be in phase quadrature with the input signal. This is convenient in the event a two-phase servomotor is to be driven from the amplifier.

In Figure 3 I have shown a form of my invention in which the rate of scan is regulated. In this form of my invention I serially connect a pair of voltage dividing resistors 170 and 172 across rotor 40. A double-pole, double-throw switch, indicated generally by the reference character 174, includes a first pair of contacts 176 and 178 and a second pair of contacts 180 and 182. The poles 184 and 186 of switch 174 are mechanically ganged and are movable to a first position where they engage contacts 176 and 178 to connect the system to operate as a stable servomechanism. Switch 174 is movable to a second position where poles 184 and 186 engage respective contacts 180 and 182 to operate in an unstable mode to superimpose a scan having a regulated rate about the null position of rotor 40 in a manner to be described hereinafter. Respective conductors 188 and 190 connect resistor 172 to poles 184 and 186. Conductors 192 and 194 connect the respective contacts 176 and 178 to conductors 196 and 198. Conductor 196 is connected by a conductor 200 to input terminal 46 of amplifier 48. Conductor 198 connects conductor 194 to the other input terminal 58 of amplifier 48. A double-pole, single-throw switch, indicated generally by the reference character 202, includes respective contacts 204 and 206 and respective poles 208 and 210. A resistor 212 connects contact 204 to one side of stator winding 136 of tachometer generator 138. I connect the other side of winding 136 to terminal 206. When the system is to operate in the stable mode, switch 202 is open so that poles 208 and 210 do not engage contacts 204 and 206.

It will be seen that when switch 174 is in the position where poles 184 and 186 engage the respective contacts 176 and 178, the portion of the synchronous transformer rotor output voltage appearing on resistor 172 is applied to the input terminals 46 and 58 and amplifier 48. The respective output terminals 60 and 62 of amplifier 48 are connected to winding 64 of servomotor 66 in the same manner as in the form of my invention shown in Figure 2. With the system so connected, it functions as a stable servomechanism. Any displacement of rotor 40 from its null position results in an output error signal on resistor 172 which is fed to amplifier 48. The amplified error signal energizes servomotor 66 to drive rotor 40 back to its null position. In the form of my invention shown in Figure 3, shaft 86 of servomotor 66 drives gears 88 directly rather than through armature 158 and shaft 160 of the tachometer generator 138. Shaft 160 is connected by any appropriate means to the armature 84 so as to be driven by it. When the form of my invention shown in Figure 3 is to operate in the stable mode, switch 202 is open and the tachometer generator 138 has no effect on the system operation. It is to be understood that, if desired, tachometer generator 138 may be employed to provide some degenerative feedback to ensure stability of the system in the manner described in connection with Figure 2.

When the form of my invention shown in Figure 3 is to be operated to superimpose a scan about the null position of rotor 40, switch 174 is moved to a position where the respective poles 184 and 186 engage contacts 180 and 182. Switch 202 is closed to place the tachometer generator operatively into the system. Contacts 180 and 182 are connected to the respective input terminals 214 and 216 of a feed-back amplifier 218. Amplifier 218 is a low-power amplifier having a carrier-type output stage which produces a high voltage output. It includes respective output terminals 220 and 222. I connect a variable feed-back resistor 224 between output terminal 220 and input terminal 214 to provide a positive feed-back loop for amplifier 218. I connect a voltage dividing resistor 226 across output terminals 220 and 222 of amplifier 218. A resistor 228 connects the brush 230 associated with dividing resistor 226 to input terminal 46 of amplifier 48. A conductor 232 connects terminal 222 to input terminal 58 of amplifier 48. It is to be understood that the gain of the feed-back loop provided for amplifier 218 is greater than unity so that amplifier 218 is driven to saturation upon any slight unbalance at its input terminals.

With the system shown in Figure 3 connected to operate in the unstable mode, a portion of the output voltage from amplifier 218, determined by the position of brush 230, is applied to the input terminals 46 and 58 of amplifier 48. This input voltage determines the limits of scan in the same manner as the scan limits are determined in the system shown in Figure 1. When switch 202 is closed, the tachometer generator output voltage from winding 136 also is applied to input terminals 46 and 58 of amplifier 48. It will be seen that two parallel input circuits are provided for amplifier 48. One branch includes a portion $E_0$ of the output voltage from amplifier 218 in series with resistor 228, the resistance of which may be designated as $R_4$. The other branch input circuit includes the tachometer generator output voltage $E_t$ in series with resistor 212, the resistance of which may be designated by $R_5$. The over-all input signal to amplifier 48 is determined by the relationship between $E_0$, $E_t$, $R_4$ and $R_5$. When the system is so connected, servomotor 66 drives the system at such a rate that the ratio of the tachometer generator output voltage $E_t$ to the resistance $R_5$ of the resistor 212 is equal to the ratio of the output voltage $E_0$ of voltage divider 226 to the resistance $R_4$ of resistor 228. This relationship may be expressed as:

$$(3) \qquad \frac{E_0}{R_4} = \frac{E_t}{R_5}$$

It will be seen that if the speed of servomotor 66 varies, the output voltage $E_t$ from tachometer generator 138 changes and the input signal to amplifier 48 changes. The resulting change in the over-all input signal to amplifier 48 is in such a direction as to change the excitation of winding 64 to cause servomotor 66 to return to its initial rate. I have thus provided a scan in which the rate of scan is closely regulated. This rate may be changed by changing the resistance of any one of resistors 226, 228 or 212. The limits of scan in this system are determined by the resistance value of feedback resistor 224. If desired, mechanical limit switches, such as switches 90 and 96, may be provided in this system.

In operation of the form of my invention shown in Figure 1 with switch 98 open, the system functions as a stable servomechanism. Any displacement of rotor 40 from its null position produces an error signal at the input terminals 46 and 58 of amplifier 48. This signal is amplified and applied to the winding 64 of servomotor 66. The polarity of the signal is such that servomotor 66 rotates in a direction to return rotor 40 to its null position. When switch 98 is closed, a positive feed-back loop having a gain which is greater than unity is established for amplifier 48. As a result, any displacement of rotor 40 from its null position produces an error signal at the input terminals 46 and 58 which drives amplifier 48 to saturation. Servomotor 66 drives rotor 40 in a direction back toward its null position. Owing to the magnitude of the output signal produced by saturated amplifier 48, servomotor 66 drives rotor 40 through its null position. After rotor 40 passes through the null position, an error signal is generated therein which is of a phase opposite to the fed back signal. Servomotor 66 continues to drive rotor 40 until the portion of the output voltage of rotor 40 applied to amplifier 48 exceeds the amplifier output voltage times the ratio of the resistance of resistor 44 to the resistance of resister 94. When this occurs, the phase of the input signal to amplifier 48 reverses and the direction of scan motion reverses. This process is repeated to superimpose a scan around the null or zero error signal position of rotor 40. This zero error signal position of rotor 40 is determined by the arbitrary control function in accordance with which rotor 18 of synchronous transmitter 10 is displaced. The limits of the superimposed scan may be varied by changing the resistance of resistor 94. If the system has mechanical limits, mechanical limit switches 90 and 96 may be connected in series with resistor 94 to determine the scan limits.

In operation of the form of my invention shown in Figure 2, with switch 106 in its first position where the respective poles 114, 116 and 118 engage contacts 108, 110 and 112, the system functions as a stable servomechanism. The error signal produced by rotor 40 is fed to the input terminals 46 and 58 of amplifier 48 in series with a portion of the output signal from winding 136 of tachometer generator 138. The phase of the portion of the tachometer generator output voltage is such as to provide a slight degenerative feedback. This assures stability for the system. When switch 106 is moved to its second position where the respective poles 114, 116 and 118 engage contacts 122, 124 and 126, the system functions to superimpose a scan on the null position of rotor 40. With the system so connected, a portion of the output voltage from rotor 40 is fed to the input terminals 46 and 58 in series with the entire output voltage of winding 136 of tachometer generator 138. The phase of the output signal from winding 136 is fed in such a direction as to produce positive feedback. In other words, generator 138 forms a positive feed-back loop having a gain which is greater than unity. Upon an initial displacement of rotor 40, servomotor 66 drives the rotor back toward its null position. Because of the feedback provided by tachometer generator 138, servomotor 66 drives rotor 40 back through its null position. The servomotor continues to drive in this direction until the algebraic sum of the portion of the output voltage of rotor 40 applied to amplifier 48, which now is of opposite phase to the tachometer generator output voltage, and the tachometer generator output voltage is less than the voltage required to saturate amplifier 48. When this occurs, the direction of drive of servomotor 66 reverses substantially instantaneously, since the output voltage of tachometer generator 138 drops immediately as servomotor 66 slows down and the input signal to amplifier 48 rapidly changes phase. In this system the scan limits are determined by the position of brush 162 on voltage dividing resistor 100.

In operation of the form of my invention shown in Figure 3 with switch 174 in its first position where the respective poles 184 and 186 engage contacts 176 and 178 and with switch 202 open, the system functions as a stable servomechanism in the same manner as the system shown in Figure 1. With switch 202 closed and with switch 174 in its second position where poles 184 and 186 engage respective contacts 180 and 182, the system functions in an unstable mode to superimpose a scan on the null or zero error signal position of rotor 40. In this condition of the system, amplifier 48 has two parallel input circuits. One of these circuits includes resistor 228 and a portion of the output voltage from feed-back amplifier 218. This voltage determines the limits of scan. The other of the parallel input circuits includes resistor 212 and the output voltage of tachometer generator 138. This branch regulates the rate at which servomotor 66 drives rotor 40. Any change in speed of servomotor 66 results in a change in the output voltage of tachometer generator 138. This change in the output voltage of tachometer generator 138 results in a change in the over-all input signal to amplifier 48 which is in a direction to return the servomotor to its initial rate. The scan limits may be changed by varying resistor 224 and the scan rate may be changed by changing the resistance of any one of the resistors 226, 228 or 212.

Thus it will be seen that I have accomplished the objects of my invention. I have provided a scanning system which superimposes a controllable scan about the null or zero error signal position of a synchroncus transformer rotor. I have provided my system with means for controlling the amplitude of the scan. In one form of my invention I have provided means for regulating the rate of the superimposed scan. My system may be employed to provide a superimposed scan on an antenna system which is driven in accordance with an arbitrary control function.

It will be understood that certain features and subcombinations are of utility and may be employed without reference to other features and subcombinations. This is contemplated by and is within the scope of my claims.

It is further obvious that various changes may be made in details within the scope of my claims without departing from the spirit of my invention. It is therefore to be understood that my invention is not to be limited to the specific details shown and described.

Having thus described my invention, what I claim is:

1. In a scanning system having means for producing an error signal as a function of the displacement of a controlled shaft from a null position, an amplifier having an input channel, means for impressing said error signal on said amplifier input channel to produce a control signal, a servomotor for driving said shaft, means for impressing said control signal upon said servomotor to drive said shaft back toward said null, and positive feed-back means for feeding a portion of said control signal to said amplifier input channel, said amplifier and feedback means having a loop gain which is greater than unity whereby said servomotor drives said shaft back through said null position until said error signal exceeds said feedback signal.

2. A scanning system as in claim 1 in which said amplifier includes output terminals and said feed-back means comprises a resistor connected between one of said output terminals and said input channel.

3. A scanning system as in claim 1 in which said amplifier includes input terminals and output terminals, said input channel includes a first resistor connected between said error signal producing means and one of said input terminals and said feed-back means comprises a second resistor connected between one of said output terminals and the input terminal to which said first resistor is connected, the construction being such that the limits of scan of said system are determined by the resistance ratio of said first resistor to said second resistor.

4. A scanning system as in claim 1 in which said amplifier includes output terminals, said feed-back means comprises a resistor and a pair of limit switches connected in series between one of said output terminals and said input channels and in which said limit switches are disposed to be actuated by said shaft to determine the limits of scan of the system.

5. A scanning system as in claim 1 including means for disconnecting said feed-back means.

6. In a scanning system having means for producing an error signal as a function of the displacement of a shaft from a null position, a first amplifier having an input channel, means for impressing said error signal on said first amplifier input channel to produce a control signal, a second amplifier having an input channel, means for impressing said control signal on said second amplifier input channel to produce an output signal, a servomotor for driving said shaft, means for impressing said output signal upon said servomotor to drive said shaft through said null position, positive feed-back means for impressing a signal which is a function of said control signal on said first amplifier input channel, said first amplifier and feed-back means having a loop gain which is greater than unity whereby said servomotor drives said shaft back through said null position until said error signal exceeds said signal proportional to the control signal, a tachometer generator driven by said servomotor to produce an output signal proportional to the speed at which said servomotor is driven and means for impressing said tachometer generator output signal on said second amplifier input channel.

References Cited in the file of this patent

UNITED STATES PATENTS 1,915,440     Nyquist ---------------- June 27, 1933

FOREIGN PATENTS 598,573     Great Britain ------------ Feb. 20, 1948

OTHER REFERENCES

Electronic and Radio Engineering, Terman, 4th edition, pp. 374–375, McGraw-Hill, New York, 1955.